US008055128B2

(12) United States Patent
Feldman

(10) Patent No.: US 8,055,128 B2
(45) Date of Patent: Nov. 8, 2011

(54) METHODS AND SYSTEMS FOR OPTIMAL LAUNCH POWER COMPUTATION IN MESHED OPTICAL NETWORKS

(75) Inventor: Sandra F. Feldman, Owings Mills, MD (US)

(73) Assignee: Ciena Corporation, Linthicum, MD (US)

( * ) Notice: Subject to any disclaimer, the term of this patent is extended or adjusted under 35 U.S.C. 154(b) by 884 days.

(21) Appl. No.: 12/098,687

(22) Filed: Apr. 7, 2008

(65) Prior Publication Data

US 2011/0052188 A1   Mar. 3, 2011

(51) Int. Cl.
    *H04B 10/08* (2006.01)
(52) U.S. Cl. ............. 398/25; 398/26; 398/27; 398/28; 398/38
(58) Field of Classification Search ........... 398/25–28, 398/34, 38
    See application file for complete search history.

(56) References Cited

U.S. PATENT DOCUMENTS

| | | | | |
|---|---|---|---|---|
| 6,069,718 A * | 5/2000 | Khaleghi | ............ | 398/27 |
| 6,674,557 B1 * | 1/2004 | DaSilva et al. | ............ | 398/79 |
| 7,095,956 B2 * | 8/2006 | Levandovsky et al. | ............ | 398/27 |
| 7,184,410 B1 * | 2/2007 | Frankel et al. | ............ | 370/252 |
| 7,308,200 B2 * | 12/2007 | Hachiya et al. | ............ | 398/79 |
| 7,460,789 B2 * | 12/2008 | Odate et al. | ............ | 398/147 |
| 7,532,818 B2 * | 5/2009 | Hsu et al. | ............ | 398/27 |
| 7,630,635 B1 * | 12/2009 | Guy et al. | ............ | 398/49 |
| 7,929,861 B2 * | 4/2011 | Solheim et al. | ............ | 398/34 |
| 2002/0048062 A1 * | 4/2002 | Sakamoto et al. | ............ | 359/124 |
| 2002/0167693 A1 * | 11/2002 | Vrazel et al. | ............ | 359/109 |
| 2002/0191903 A1 * | 12/2002 | Neuhauser | ............ | 385/24 |
| 2003/0016410 A1 * | 1/2003 | Zhou et al. | ............ | 359/110 |
| 2003/0016414 A1 * | 1/2003 | Solheim et al. | ............ | 359/127 |
| 2003/0169998 A1 * | 9/2003 | Premaratne et al. | ............ | 385/147 |
| 2004/0042793 A1 * | 3/2004 | Hachiya et al. | ............ | 398/79 |
| 2004/0208516 A1 * | 10/2004 | Clark et al. | ............ | 398/26 |
| 2006/0023641 A1 * | 2/2006 | Nakashima et al. | ............ | 370/254 |
| 2007/0292130 A1 * | 12/2007 | Pegg et al. | ............ | 398/20 |

* cited by examiner

*Primary Examiner* — Kenneth N Vanderpuye
*Assistant Examiner* — Hibret Woldekidan
(74) *Attorney, Agent, or Firm* — Clements Bernard PLLC; Christopher L. Bernard; Lawrence A. Baratta, Jr.

(57) ABSTRACT

The present invention provides methods and systems for efficiently computing optimal optical launch powers for meshed optical networks. The present invention can be utilized to find optimal launch powers for multiple wavelengths in a meshed dense-wave division multiplexed (DWDM) system. Generally, the present invention ensures Q exceeds a threshold for OSNR, and then the launch powers are optimized based on nonlinear penalties. If Q is below the threshold, DWDM equipment changes/additions are incorporated to provide adequate OSNR. The present invention provides a computationally efficient mechanism to optimize launch powers in 10 Gb/s, 40 Gb/s, 100 Gb/s, etc. highly-meshed optical networks.

20 Claims, 11 Drawing Sheets

METHODS AND SYSTEMS FOR OPTIMAL LAUNCH POWER COMPUTATION IN MESHED OPTICAL NETWORKS

FIELD OF THE INVENTION

The present invention relates generally to optical networks. More particularly, the present invention provides methods and systems for efficiently computing optimal optical launch powers for meshed optical networks.

BACKGROUND OF THE INVENTION

Regional optical networks combine long reach with complicated mesh designs and a variety of fiber types, such as Non-dispersion Shifted Fiber (NDSF), Lambda Shifted (LS), Truewave (TW), Truewave Classic (TWC), Truewave Reduced Slope (TWRS), Large Effective Area Fiber (LEAF), Enhanced LEAF (eLEAF), Dispersion Shifted Fiber (DSF), Teralight, and the like. Traffic demands can have variable lengths and can overlap along portions of the network. Optimizing network performance while minimizing network cost under these circumstances in meshed designs is a challenge.

Most equipment manufacturers have computer tools to assist the network designer in the process of choosing and configuring telecommunication equipment. In the simplest designs, equipment configuration is preset and the tool attempts to place the equipment to create the most efficient network. More sophisticated tools both choose the equipment and recommend the most appropriate parameter settings (hardware and/or software) in order to achieve the desired network cost points and performance. For example, these tools can provide amplifier and regenerator locations based upon an input of traffic demands A-Z, sites, and network parameters (e.g., fiber type, site distances, etc.).

Choosing the optimal launch powers for demands on a network has a direct bearing on the efficiency and cost to build and maintain that network. If launch power is not optimized, individual traffic demands are more likely to require regeneration. Regeneration increases initial network equipment cost at deployment, since at a minimum more transceivers and more filters are required. More equipment is also likely to increase lifetime operating cost. Thus choosing the optimal launch power decreases equipment count and cost. In addition, consider the impact of launch power optimization on demands which do not require regeneration, even with non-optimized launch power. These demands will have less operating margin than demands with optimized launch power. Increased operating margin is reasonably expected to lead to improved traffic performance and greater network reliability over the equipment lifetime.

Finding the optimal launch power for any given demand on a network is a balancing act between optical signal-to-noise ratio (OSNR) and nonlinear penalties, such as Four Wave Mixing (FWM), Self Phase Modulation (SPM), Cross Phase Modulation (XPM), and the like. If the launch power is too low, the OSNR is insufficient for a good signal; launching a traffic demand with higher power increases the OSNR at the receiver. However, increasing signal launch power increases the nonlinear penalties. If the launch power is too high, the nonlinear penalties are excessive and performance suffers. To further complicate matters, nonlinear penalties are a function not only of launch power and fiber type, but also of span and link characteristics (i.e., dispersion, number of spans, individual span length, and the like).

In a simple linear, point-to-point network without overlapping lightpaths, it is fairly straightforward to calculate the optimum launch power for best receiver performance. In linear networks with partially overlapping lightpaths, the optimal launch power for each of the demands can be computed independently. The designer is then likely to discover that the optimal launch powers on some spans and links may be different for different demands. If the network is not too large and the number of overlapping demands is not too high, the network designer may be able to find launch powers that satisfy all demands.

In meshed networks, the problem continues to grow more complex with the increasing possibilities for partially overlapping demands with otherwise diverse routing. Some equipment providers solve the problem by simply choosing a default span launch power which may be allowed to vary by fiber type, but is otherwise constant through the network. This power is generally chosen to be low enough so that the nonlinear penalties of the longest guaranteed demands remain below a maximum, pre-determined threshold.

There are a number of problems with this solution, since this approach is not at all customized to the nature of the particular network in question. For example, if the network has few (or no) long demands, nonlinear penalties are minimal and this approach forces the launch power to be artificially low. Better performance might be achieved with higher powers, particularly if the network has a significant number of high loss spans. Conversely, if the network has many long demands and typical spans are relatively short and low loss, better network performance is likely to be achieved with relatively low launch powers that avoid triggering nonlinear penalties.

A brute force method to optimize network launch power by trying out all possible launch power permutations is theoretically possible, but is not a reasonable solution for all but the smallest, simplest networks.

BRIEF SUMMARY OF THE INVENTION

In various exemplary embodiments, the present invention provides methods and systems for efficiently computing optimal optical launch powers for meshed optical networks. The present invention can be utilized to find optimal launch powers for multiple wavelengths in a meshed dense-wave division multiplexed (DWDM) system. Generally, the present invention ensures demands meet a minimum OSNR and linear Q, and then the launch powers are optimized based on nonlinear penalties. If Q is below the threshold, DWDM equipment changes/additions are incorporated to provide adequate OSNR. The present invention provides a computationally efficient mechanism to optimize launch powers in 10 Gb/s, 40 Gb/s, 100 Gb/s, etc. highly-meshed optical networks.

In an exemplary embodiment of the present invention, an optimal launch power computation method for an optical network includes assigning a plurality of demands to a plurality of wavelengths; determining optical equipment based on a network topology and the plurality of wavelengths; computing linear Q for each lightpath in the optical network, wherein each lightpath includes a start and end of one of the plurality of wavelengths; adjusting optical equipment parameters if one or more lightpaths include a linear Q below a linear Q threshold and recomputing linear Q for each lightpath in the optical network; computing nonlinear Q for each lightpath in the optical network; and performing nonlinear optimization for optical launch powers on each lightpath in the optical network with a nonlinear Q below a nonlinear Q threshold. The optimal launch power computation method can further include setting launch powers for the plurality of wavelengths to a predetermined default launch power;

wherein the adjusting optical equipment parameters step includes changing the launch powers.

The optimal launch power computation method can also further include computing a nonlinear penalty for each of the plurality of wavelengths; wherein the nonlinear penalty is utilized by the computing nonlinear Q step and the performing nonlinear optimization step. Optionally, the nonlinear penalty is computed for four wave mixing, self phase modulation, and cross phase modulation. The nonlinear penalty for four wave mixing and cross phase modulation can be computed using linear scaling rules to extrapolate to different powers; and the nonlinear penalty for self phase modulation computed using a quadratic fit. Optionally, nonlinear optimization includes finding launch powers for the plurality of wavelengths that leads to the greatest number of demands on each link with passing Q values. The assigning step can utilize lengths and fiber types of the optical network to assign the plurality of wavelengths to the plurality of demands. Alternatively, the nonlinear optimization includes adding fill channels to the plurality of wavelengths to optimize for future growth of the plurality of demands. Optionally, the adjusting optical equipment parameters step includes adding a regenerator to a demand of the plurality of demands if Q cannot be corrected through nonlinear optimization.

In another exemplary embodiment of the present invention, a highly meshed optical network launch power computation method includes defining network parameters of an optical network, wherein the network parameters include node locations, fiber types, A-Z traffic demands; performing network design including assigning equipment to the node locations for the A-Z traffic demands; assigning a default target launch power for each fiber span in the optical network; computing linear Q performance for each of a plurality of wavelengths in the optical network; if one or more of the plurality of wavelengths have a linear Q below a linear Q threshold, performing adjustments to the network design; computing full Q performance comprising linear and nonlinear penalties for the plurality of wavelengths; and optimizing optical launch powers on for each of the plurality of wavelengths. Optionally, the computing linear Q performance and computing full Q performance steps utilize a representative sample of the plurality of wavelengths to increase computing efficiency.

The computing linear Q performance and computing full Q performance steps each can further include checking computed performance versus a threshold and exiting to the performing network design step to redesign the network if the computed performance is below a threshold. Optionally, the nonlinear penalties are computed for four wave mixing, self phase modulation, and cross phase modulation. The nonlinear penalties for four wave mixing and cross phase modulation can be computed using linear scaling rules to extrapolate to different powers and the nonlinear penalty for self phase modulation computed using a quadratic fit. The optimizing step can include finding launch powers for the plurality of wavelengths that leads to the greatest number with passing Q values versus a Q threshold. Optionally, the performing network design step utilizes the network parameters to assign the A-Z traffic demands; and performing adjustments includes one of increasing the default target launch power for the one or more of the plurality of wavelengths and placing a regenerator along a path of the one or more of the plurality of wavelengths. The highly meshed optical network launch power computation method can also further include adding fill channels to the plurality of wavelengths to optimize for future growth of the A-Z traffic demands.

In yet another exemplary embodiment of the present invention, an optimal launch power computation system includes a data store; a network interface; input/output interfaces; and a processor coupled to each of the data store, the network interface, and the input/output interfaces. The processor is configured to: determine optical equipment based on an optical network topology, a plurality of demands between sites on the optical network, and a plurality of wavelengths, wherein launch powers for the plurality of wavelengths are set to predetermined default launch powers; compute linear Q for each lightpath in the optical network, wherein each lightpath includes a start and end of one of the plurality of wavelengths; adjust the optical equipment if one or more lightpaths include a linear Q below a linear Q threshold and recomputing linear Q for each lightpath in the optical network; compute nonlinear Q for each lightpath in the optical network based on computed nonlinear penalties; and perform nonlinear optimization for optical launch powers on each lightpath in the optical network with a nonlinear Q below a nonlinear Q threshold. The nonlinear penalties can be computed for four wave mixing, self phase modulation, and cross phase modulation; wherein the nonlinear penalty for four wave mixing and cross phase modulation is computed using linear scaling rules to extrapolate to different powers; and wherein the nonlinear penalty for self phase modulation is computed using a quadratic fit. Optionally, nonlinear optimization includes finding launch powers for the plurality of wavelengths that leads to the greatest number of demands on each link with passing Q values.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides methods and systems for efficiently computing optimal optical launch powers for meshed optical networks. The present invention can be utilized to find optimal launch powers for multiple wavelengths in a meshed dense-wave division multiplexed (DWDM) system. Generally, the present invention ensures demands meet a minimum OSNR and linear Q, and then the launch powers are optimized based on nonlinear penalties. If Q is below the threshold, DWDM equipment changes/additions are incorporated to provide adequate OSNR. The present invention provides a computationally efficient mechanism to optimize launch powers in 10 Gb/s, 40 Gb/s, 100 Gb/s, etc. highly-meshed optical networks.

The present invention achieves better network performance than the compromises associated with conventional techniques. An analysis is provided of meshed networks without placing any restrictions on topology complexity. Additionally, the present invention provides a computationally efficient algorithm. The present invention can be incorporated into optical network planning and design tools, but could be extended to other tools and/or other hardware suites.

Figure 1:
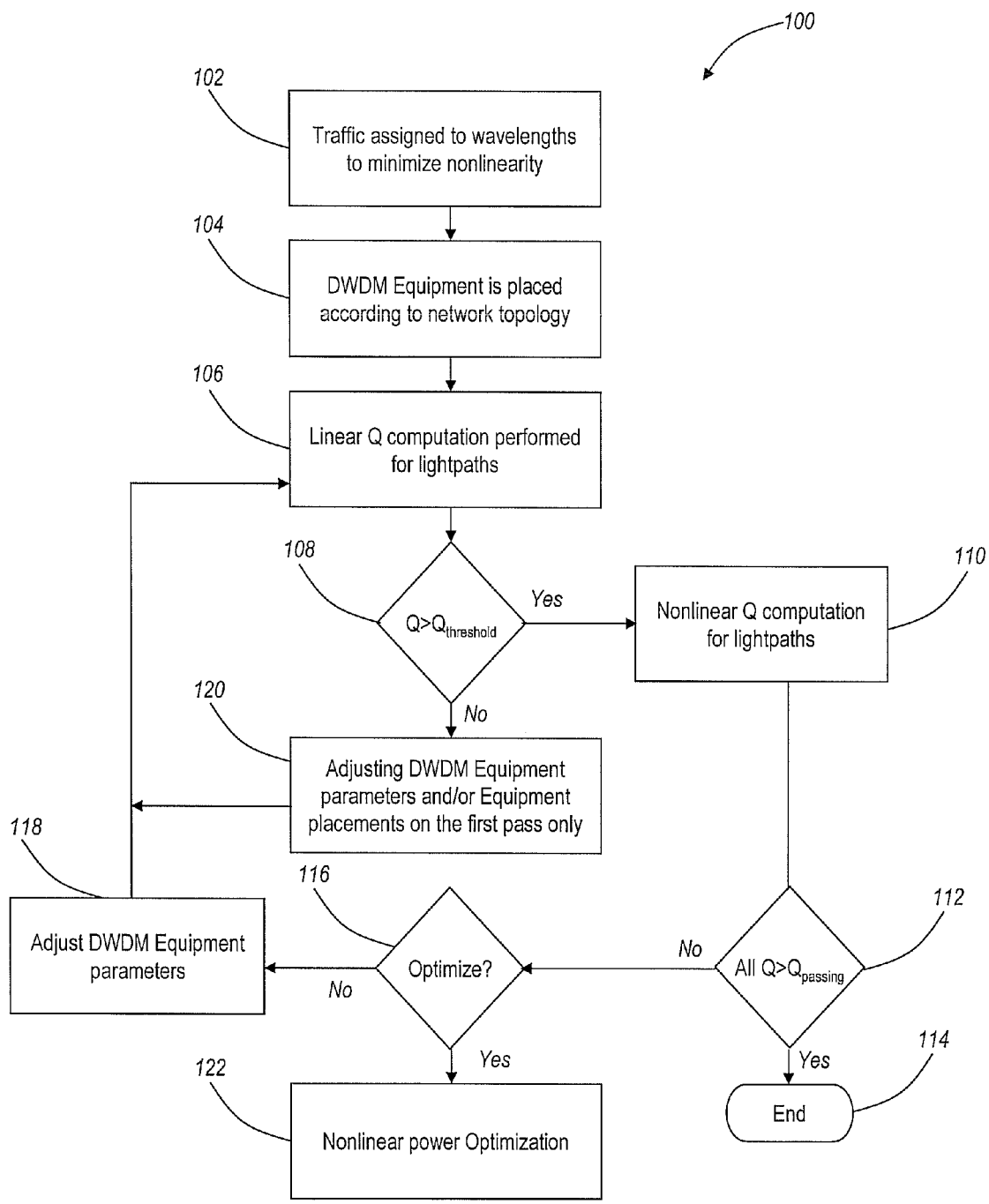
FIG. 1 is a flow chart of optical launch power computation for meshed optical networks according to an exemplary embodiment of the present invention.

Referring to FIG. 1, a flow chart illustrates an optical launch power computation 100 for meshed optical networks according to an exemplary embodiment of the present invention. The optical launch power computation 100 provides a mechanism to optimally and efficiently compute launch powers for multiple wavelengths in a meshed optical network. As described herein, a meshed optical network includes multiple sites with DWDM terminals, optical amplifiers, reconfigurable optical add/drop multiplexers (ROADMs), fixed OADMs, optical regenerators/wavelength converters, and the like. The multiple sites are interconnected through multiple optical links (i.e., optical fiber) in a meshed configuration, e.g. multiple sites interconnect through one or more physical paths. The DWDM terminals can include optical transceivers utilizing various formats and bit-rates, e.g. 10 Gb/s, 40 Gb/s, 100 Gb/s, etc. The optical launch power computation 100 is configured to be independent of format and bit-rate, although assumptions and specifications used in the optical launch power computation 100 may be affected by the format and bit-rate.

The optical launch power computation 100 utilizes assumptions and initial conditions to provide launch power optimization for existing traffic and for future growth scenarios. The meshed optical network could include hundreds of links with each link equipped with hundreds of wavelengths. Advantageously, the optical launch power computation 100 is computationally efficient to provide optimized launch powers for highly meshed networks with overlapping traffic demands. This optimization can lead to reduced capital equipment costs, i.e. less regenerators, amplifiers, etc., and reduced operating expenses because of the reduced equipment. Further, optimized launch powers provide improved network performance over time, and the optical launch power computation 100 reduces network engineering and planning requirements up front.

FIG. 1 illustrates a high-level overview of the optical launch power computation 100. Traffic is assigned to wavelengths to minimize nonlinear penalties (step 102). Here, traffic demands from A-Z are allocated between various sites in the meshed optical network. Network performance can be improved by careful consideration of wavelength assignment. Long demands that may be susceptible to nonlinearity should preferentially be assigned wavelengths which perform better (i.e., a lower nonlinear penalty). Wavelengths which tend to have higher nonlinear penalties should be assigned to short demands. The optimal wavelength will be a function of fiber type. The optical launch power computation 100 includes mechanisms to assist a network planner in assigning the wavelengths properly. Note, step 102 is optional and may be omitted.

For example, networks with multiple short NDSF links are highly linear. Networks with long links of multiple short, low-loss spans of TWC or LS fiber are highly non-linear. In between these two extremes, there are many other identifiable cases. The optical launch power computation 100 focuses on these types of assumption at the initial planning phase to find an acceptable starting point. In highly-meshed optical networks, it is difficult to partition the network into one of these cases. However, the optical launch power computation 100 can include design algorithms for these special cases which take an initial "intelligent guess" at the most appropriate network design to streamline computation based on this initial condition.

Next, DWDM equipment is placed according to the network topology (step 104). Here, multiple sites in the optical network are configured with various DWDM equipment configurations, such as optical transceivers, optical amplifiers, filters, ROADMs, OADMs, optical regenerators, dispersion compensation modules (DCMs), variable optical attenuators (VOAs), and the like. For the terminal sites (i.e. A-Z traffic termination points), optical filters (e.g., fixed or reconfigurable) are provided based on the traffic and wavelength plan. Additionally, excess capacity could be included for future growth demands.

For each traffic demand, the optical launch power computation 100 notes which other wavelengths are present due to overlapping demands on each span of the meshed optical network. This is done to note coherence (or lack thereof) between co-propagating demands. If the network is being analyzed on an "as-is" basis (i.e., all traffic known), then only provisioned demands are considered. If the network is being analyzed for future growth, then the impact of "unknown" future demands is also considered.

While placing the DWDM equipment, a default target launch power is assigned for each fiber span. This launch power is used as a starting point for the optical launch power computation 100. The optical launch power computation 100 can also placed "common" DWDM equipment, including amplifiers and DCM in the network, using similar algorithms as are known in the art. These algorithms can be utilized to set common equipment parameters including amplifier gain (where adjustable), variable attenuators, Raman amplification, gain borrowing, and pre-emphasis (i.e., launch power tilt). Dispersion compensation placement provides another opportunity for network performance optimization. Note, these algorithms do not consider nonlinear penalties. Equipment placement algorithms may not explicitly consider nonlinear penalties, but they may be driven by knowledge of how to control nonlinear penalties. For example, the DCM placement does not explicitly compute XPM or SPM. However, an algorithm can be used to place DCM that is known to minimize XPM & SPM.

The optical launch power computation 100 next computes the performance for each lightpath (i.e., demand) using a linear, Q computation (step 106). This calculation includes the impact of OSNR and residual dispersion at each receiver, but excludes nonlinear penalties. For each demand, the optical launch power computation 100 determines whether or not the linear Q is greater than a $Q_{threshold}$ (step 108). The $Q_{threshold}$ represents a minimum Q for a specified bit-error rate (BER). $Q_{threshold}$ is adjustable based on the different bit-rates, transmission formats, and required BER. To increase computation speed, the optical launch power computation 100 can analyze only representative demands. For example, if there are four adjacent wavelengths following the same traffic path, it can be sufficient to analyze just one of the four wavelengths. Depending on the results of the linear Q computation in step 108, the optical launch power computation 100 can follow two different computational paths.

If all demands have Q greater than $Q_{threshold}$, then the optical launch power computation 100 performs nonlinear validation (step 110). A full Q computation, including nonlinear penalty, is done for each demand or for a representative sample set. If all demands pass validation, i.e. if Q is greater than a $Q_{passing}$ (step 112), then the optical network is considered complete (i.e., optimal powers have been set) and there is no need to complete any of the following computation steps (step 114). If all demands pass, the network is complete. The powers might not be optimal, however, since power adjustment could possibly provide more margin. The powers are "sufficient."

If any demand does not pass validation (step 112), then the optical launch power computation 100 checks to see if it can optimize through nonlinear optimization (step 116). If the demands do not pass validation and the optical launch power computation 100 cannot perform nonlinear optimization to rectify the failing demands, then the optical launch power computation 100 can adjust DWDM parameters (step 118) and recomputed linear Q performance for the lightpaths (step 106).

For example, before performing the validation calculations, the demands can be grouped by lightpath, and the lightpaths are sorted by Q. The demands are evaluated starting with the demands from the lightpath with the lowest Q values first. As soon as a demand fails validation, the optical launch power computation 100 exits validation and proceeds to optimization. This is done to optimize execution efficiency, i.e., launch powers need optimization, this determination should be made as quickly as possible. Advantageously, starting with the demands most likely to fail allows the optical launch power computation 100 to skip excess computation.

If the linear Q is less than a $Q_{threshold}$ (step 108) for one or more demands, then these demands did not have minimum passing Q values. Here, the optical launch power computation 100 skips the initial nonlinear computation step 110 since the demands fail with a linear computation. The optical launch power computation 100 has two options depending on the network design was done for default launch powers or maximum launch powers. Here, the optical launch power computation 100 either adjusts DWDM equipment parameters, adds additional DWDM equipment on the first pass, or both (step 120).

If the launch powers used in the network design were the default launch powers, the optical launch power computation 100 first determines whether increasing the launch power has the potential to improve performance sufficiently before proceeding to nonlinear optimization. Additionally, the optical launch power computation 100 can adjust other parameters, such as DCM tolerance, VOA settings, and the like. If these adjustments do not suffice, the optical launch power computation 100 needs to add a regenerator somewhere along the lightpath for the demand.

Note, in the first step of calculations, the Q calculation is strictly linear, and nonlinearities will only decrease Q. So, there is no need to explore decreasing launch power. Increasing launch power, however, may increase the OSNR and may be sufficient to allow the optical launch power computation 100 avoid a regenerator. For all failing demands, the optical launch power computation 100 increases the launch power to the maximum launch power as dictated by the fiber type and channel count and then reevaluates the linear Q (step 106).

The optical launch power computation 100 can cap the launch power for small core or low dispersion fibers at lower values than for fibers which generally suffer lower nonlinear penalties, and as-is designs may allow higher launch powers than 40 channel guaranteed designs. If the estimated linear Q fails at maximum launch power, the optical launch power computation 100 needs to place regenerators for those channels. This is done, and new default powers are set for the DWDM equipment.

On the other hand, if the increased power leads to linear Q passing, then the optical launch power computation 100 increases target launch powers to the maximum launch power and proceeds to recalculate linear Q (step 106). Optionally, designing a network at maximum launch power provides a streamline computation by skipping optimization. If the network is fairly linear (i.e., low nonlinear penalties), this approach can work. Alternatively, the optical launch power computation 100 could verify that increasing power to increase OSNR is sufficient to increase Q to passing levels, but would then progress to nonlinear optimization rather than setting all launch powers to the maximum level.

A nonlinear power optimization (step 122) is performed if the optical launch power computation 100 can optimize the demands to provide passing Q values (step 116) through the optical launch power computation 100. Here, all demands have passed the linear Q threshold comparison, but some have failed the nonlinear Q threshold. The nonlinear launch power optimization begins with an independent computation of each nonlinear penalty for each demand. Once again, demands may be sampled for efficiency. The optical launch power computation 100 analyzes Four Wave Mixing (FWM), Self Phase Modulation (SPM), and Cross Phase Modulation (XPM). The OSNR at the receiver can also be computed. For impairments which involve interaction with neighboring channels, the optical launch power computation 100 considers provisioned and "future" demands. FWM, XPM, and OSNR are computed at the actual launch powers. SPM is computed at low and high powers rather than at the actual.

The optical launch power computation 100 uses simple scaling rules to extend the penalty and OSNR computations to both higher and lower launch powers. Linear rules are expected to be sufficient for FWM, XPM, and OSNR, although other approaches can be used. Eye closure due to SPM is not linear, and requires computation at two additional powers and a quadratic fit. Note, the optical launch power computation 100 could also include other penalties as are known in the art, such as polarization mode dispersion (PMD) and the like.

The optical launch power computation 100 computes for each provisioned demand (or a sample demand set) an expected Q vs. a "launch power delta" based on the estimated nonlinear penalties. Note, there are different launch powers for each different fiber type. Launch power delta is the deviation from actual. For this computation, it is assumed that all spans have their launch powers increased (or decreased) by the same amount. With the estimated Q values, the optical launch power computation 100 can compile a table of the expected number of passing channels for each demand as a function of launch power delta.

Following this computation, span and link launch power values are reassigned based on the nonlinear estimations. For each link in the network, launch power value that leads to the greatest number of demands with passing Q is determined, and this is used as the new link launch power. The optical launch power computation 100 can include a number of "tie-breaker" options to consider if more than one launch power leads to the same number of passing demands, including looking at the Q values. Note that the launch power deviation (from actual) may vary around the network and also the power which is chosen may not optimize any particular demand. The goal of the optical launch power computation 100 is to find the launch powers that lead to the greatest number of passing demands, which strongly correlates with the most efficient, cost effective network.

The optical launch power computation 100 can proceed to nonlinear validation again once launch powers have been optimized. Here, a full Q calculation is performed, including full nonlinear computation, for each demand. Once again, sampling may be appropriate to reduce computation requirements. As before, demands from the lightpath with the lowest (expected) Q are calculated first, and all pertinent nonlinear effects (as well as the impact of amplifier ripple and dispersion uncertainty) are included. Any demand which fails validation is marked for regeneration. Unlike before, even after an individual demand fails validation, validation continues until all demands from the lightpath in question are evaluated. Regeneration could be done on a subband or a wavelength basis; some channels in the lightpath may require regeneration and others may not. Once the lightpath with the failed demand(s) is fully analyzed, exit the validation step, place regenerators on the failing channels, and proceed back to redesign the network to accommodate the modified demand plan. Since the network is modified as a result of placing the lightpath, the optical launch power computation 100 does not analyze any additional lightpaths until these network modifications have been made. If all of the demands pass validation, the network can be considered complete.

Figure 2:
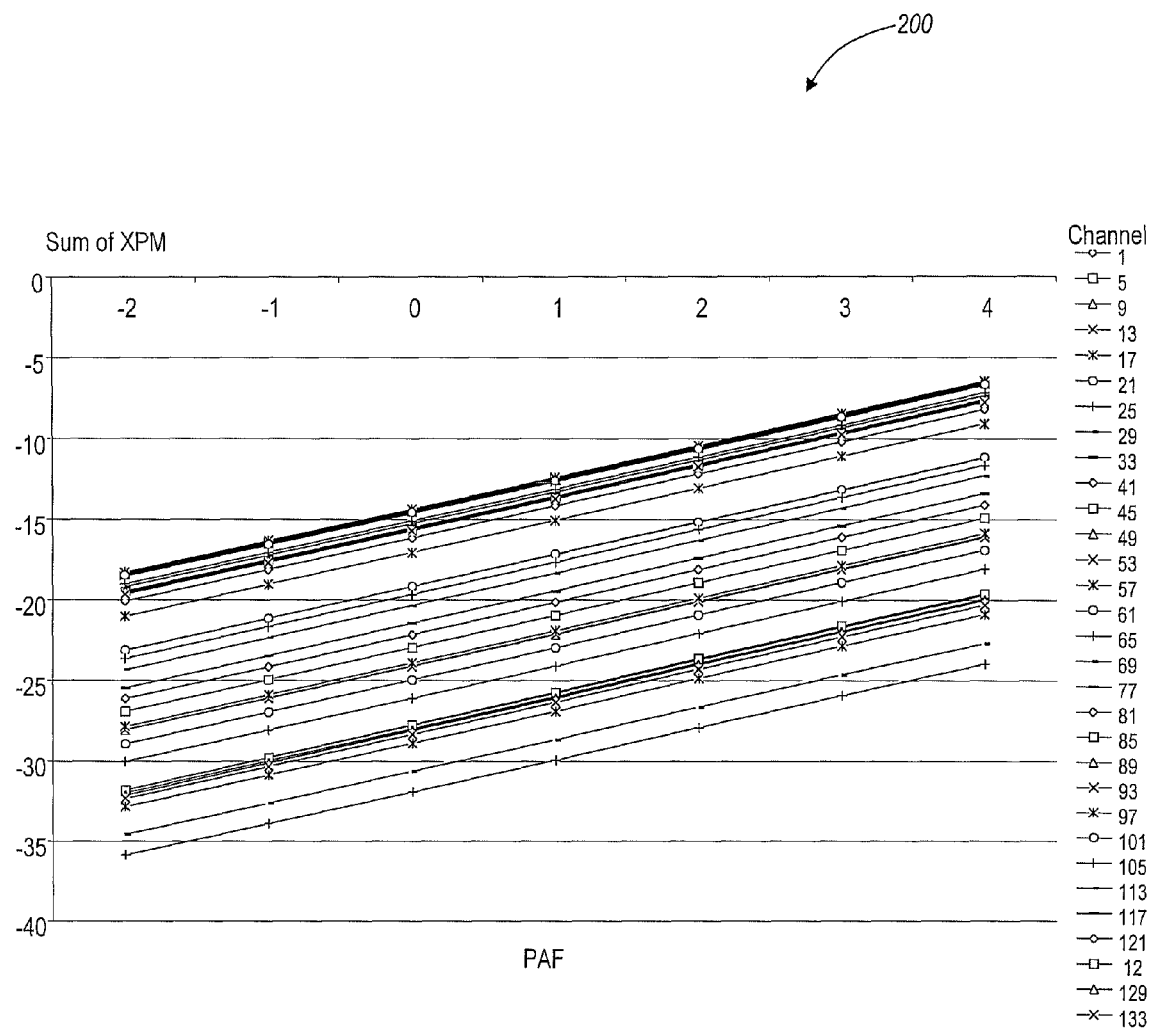
FIG. 2 is a graph of Cross Phase Modulation (XPM) penalty as a function of launch power according to an exemplary embodiment of the present invention.
Figure 3:
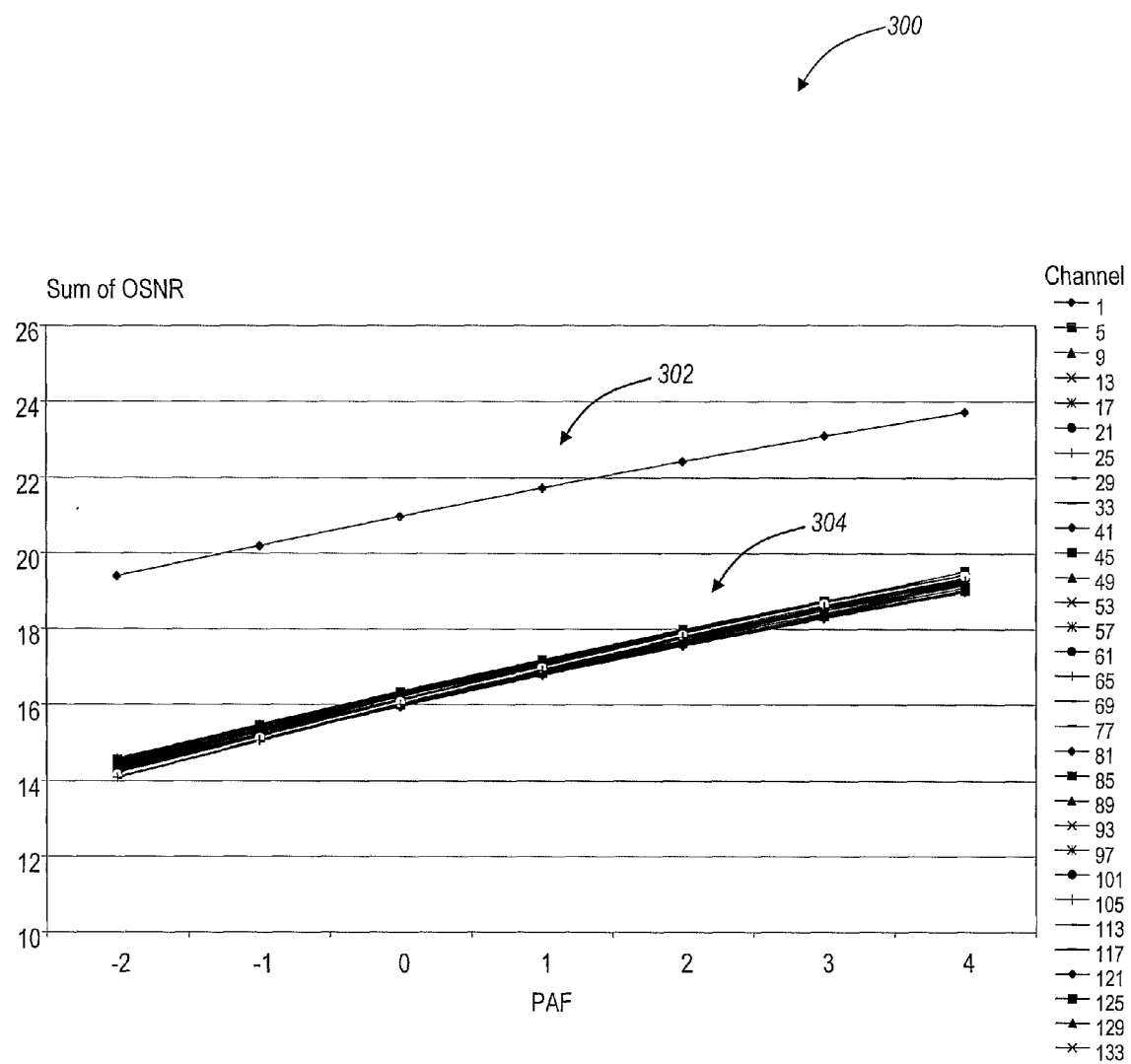
FIG. 3 is a graph of receive Optical Signal-to-Noise Ratio (OSNR) as a function of launch power according to an exemplary embodiment of the present invention.
Figure 4:
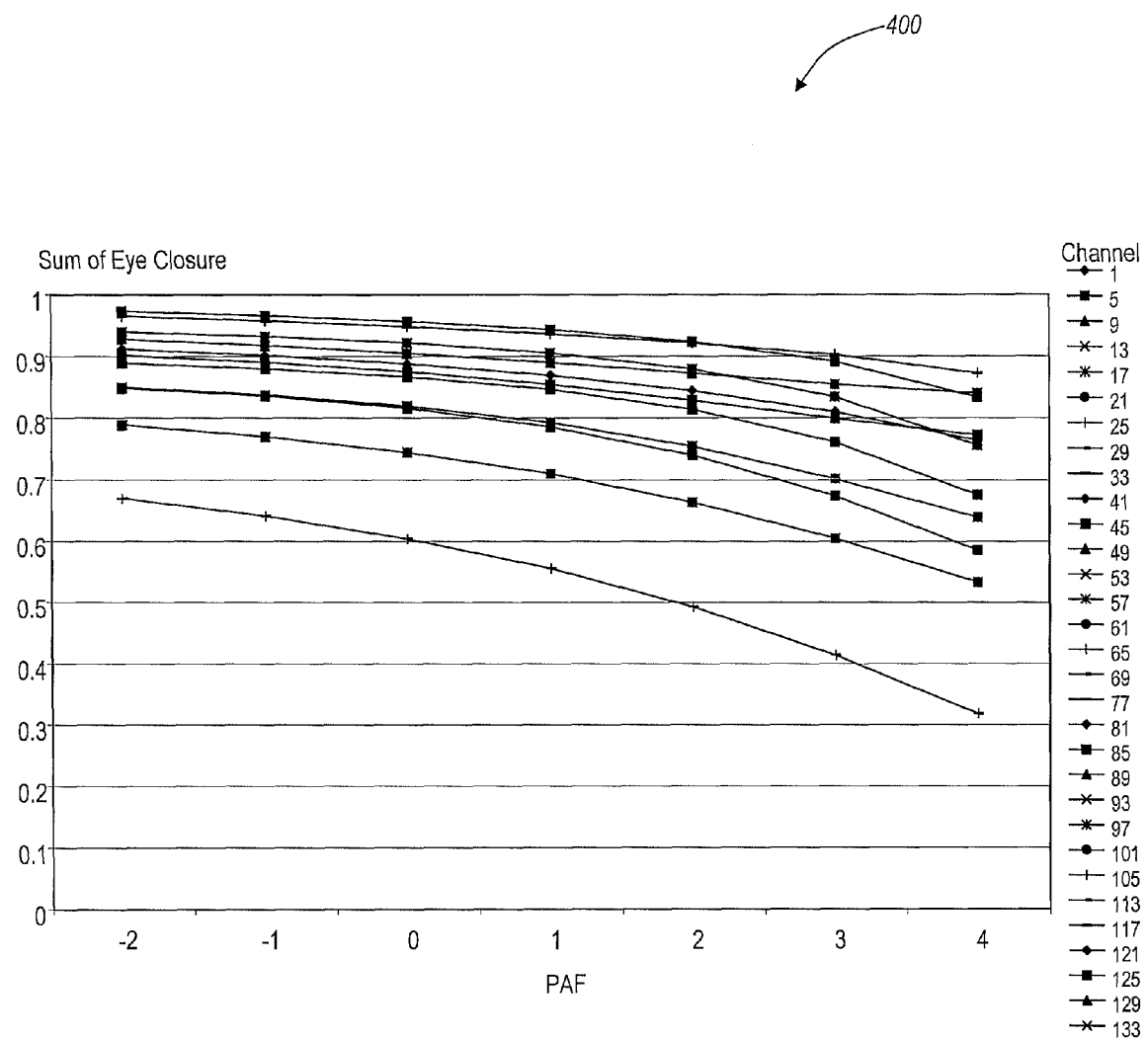
FIG. 4 is a graph of eye closure penalty due to Self Phase Modulation (SPM) as a function of launch power according to an exemplary embodiment of the present invention.
Figure 5:
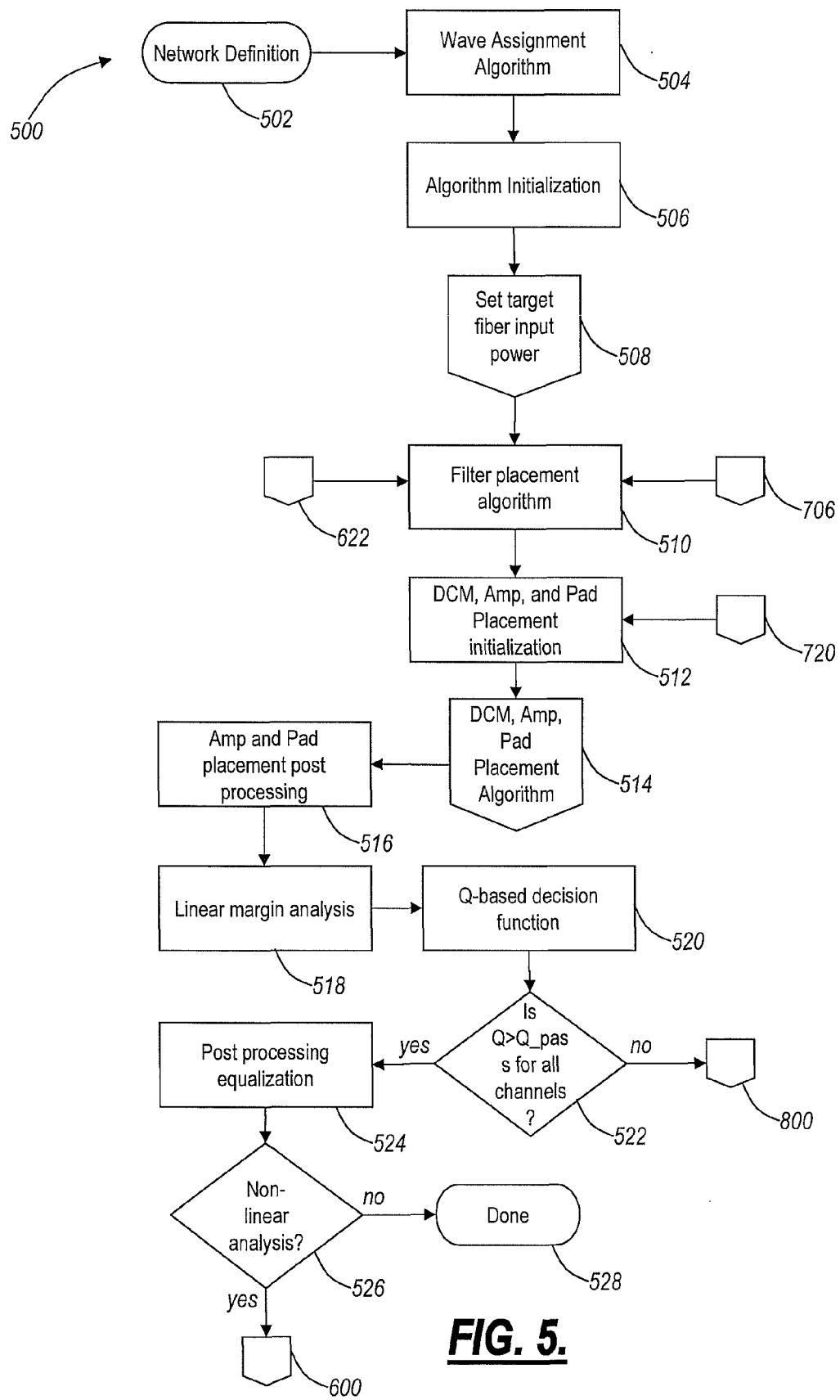
FIGS. 5-8 are flow charts of a detailed launch power computation for a meshed optical network according to an exemplary embodiment of the present invention.
Figure 6:
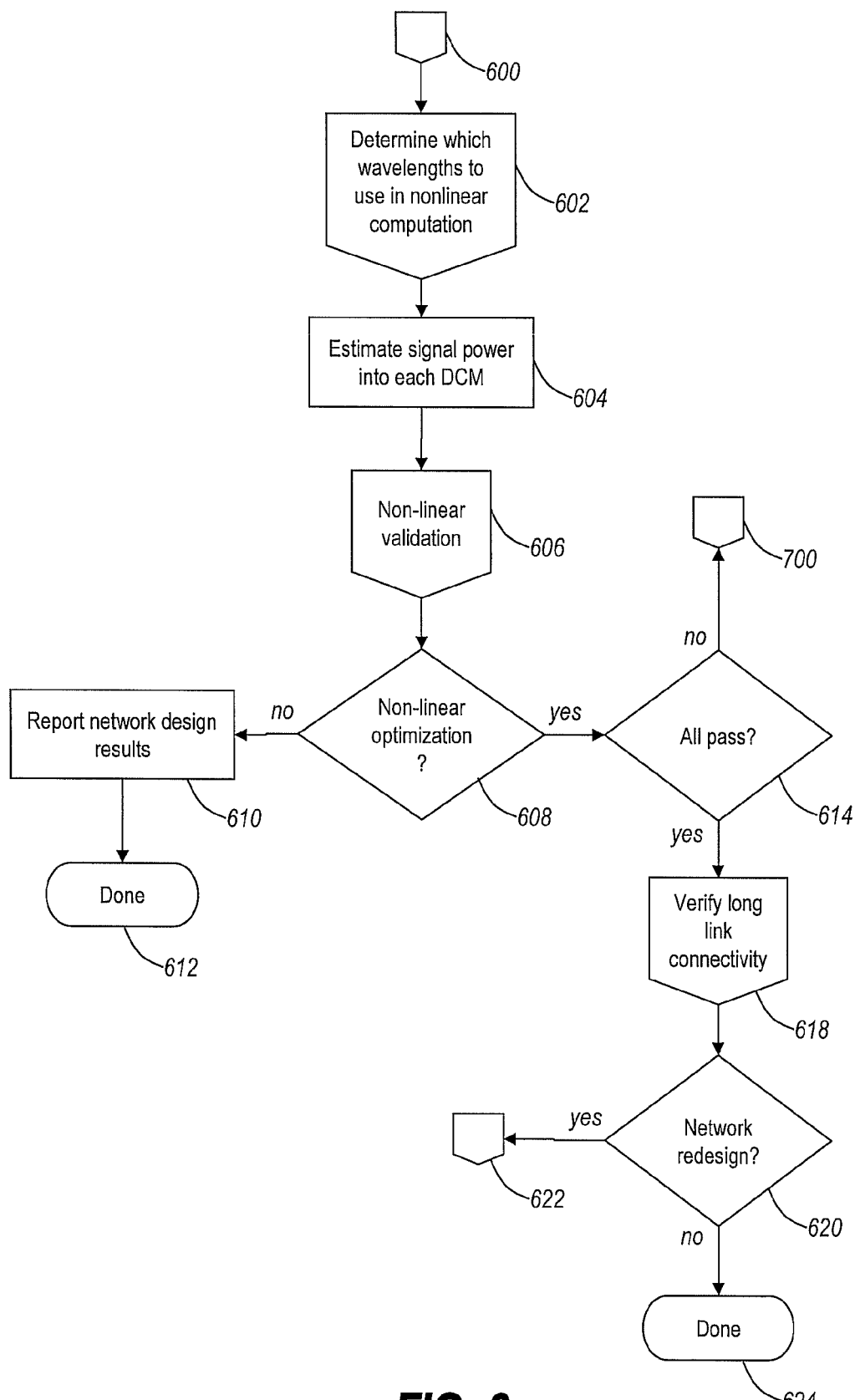

Referring to FIGS. 2-4, graphs 200, 300, 400 illustrate various nonlinear penalties as a function of launch power variation according to an exemplary embodiment of the present invention. These graphs 200, 300, 400 are utilized in the optical launch power computation 100 to develop estimations for nonlinear penalty as a function of launch power to compute optimal launch powers. These graphs 200, 300, 400 illustrate exemplary 10 Gb/s wavelengths for 133 channels. Here, channel 1 represents a channel at the low end (i.e., "blue" wavelengths) of the ITU frequency grid, e.g. 1530 nm, and channel 133 represents a channel at the high end (i.e., "red" wavelengths) of the frequency grid, e.g. 1560 nm. Those of ordinary skill in the art will recognize that graphs can be utilized with different bit rates (e.g., 40 Gb/s, 100 Gb/s, etc.) and different wavelengths to provide assumptions for the optical launch power computation 100 to utilize.

FIG. 2 illustrates a graph 200 of Cross Phase Modulation (XPM) penalty as a function of launch power delta ("PAF"). As shown by the graph 200, the XPM penalty is approximately linear with an approximately 2 dB increase in penalty for each 1 dB increase in launch power. Accordingly, the optical launch power computation 100 can utilize these assumptions to compute a penalty for XPM based on launch power, i.e. 2 dB increase from a set starting point based on the wavelength per 1 dB increase in launch power. Additionally, the Four Wave Mixing (FWM) penalty is nearly identical to XPM for 10 Gb/s wavelengths in both appearance and slope, and therefore is not shown. Similarly, the optical launch power computation 100 can utilize a starting point for XPM and the same calculation for each wavelength to determine an XPM penalty.

FIG. 3 illustrates a graph 300 of receive OSNR as a function of launch power delta ("PAF"). A first line 302 illustrate a shorter lightpath, and a group of lines 304 illustrate longer lightpaths. OSNR is nearly linear as a function of launch power, and increases by approximately 5 dB over a 6 dB input power variation. The optical launch power computation 100 can utilize these assumptions to provide calculations for receive OSNR.

FIG. 4 illustrates a graph 400 of eye closure penalty due to Self Phase Modulation (SPM) as a function of launch power delta ("PAF"). Eye closure is illustrated for selected 10 Gb/s wavelengths (i.e., 1 to 133 channels) across the ITU frequency grid. Eye closure penalty is approximately quadratic, and intermediate values can be acceptably estimated using a quadratic fit approximation against the lowest and highest launch power values and a central launch power value. The optical launch power computation 100 can utilize this quadratic fit approximation to determine an eye closure penalty for SPM.

Referring to FIGS. 5-8, a flow chart illustrates a launch power computation 500 for a meshed optical network according to an exemplary embodiment of the present invention. The launch power computation 500 illustrates a detailed exemplary embodiment of the optical launch power computation 100. First, the optical network is defined (step 502). This initial step includes details about the network, such as node locations, amplifier locations, fiber connectivity (i.e., distances, fiber types, losses, etc.), transceiver selection, port assignments at each node, and the like. Effectively, this initial step provides all details concerning the network to the launch power computation 500 to enable an optimum calculation of launch powers.

Next, a wave assignment algorithm is optionally implemented (step 504). For example, certain combinations of wavelengths and fiber suffer much greater nonlinearity than others. In general, "red" wavelengths have nonlinear impairments on LS fiber. In general, "blue" channel have greater impairments on TWC, and, to a lesser degree, other TW fibers. The wave assignment algorithm can attempt to improve network performance by identifying lightpaths with high nonlinear "risk" to populate those lightpaths with appropriate wavelengths, such as shorter distance demands. Additionally, lightly loaded networks could be managed by reassigning wavelengths after the initial wave assignment path.

The launch power computation 500 algorithm is initialized (step 506). The launch power computation 500 can utilize various flags during operation to determine state of various variables. These flags are set in step 506 to initial values. For example, the launch power computation 500 can include a Nonlinear_valid_Flag which is initially set to either initial or optimize, an optimization_flag set initially to false, and the like. One of the functions of the flags is to enable the launch power computation 500 to exit optimization as soon as a failed channel is discovered to go back to validation and correction. Advantageously, this provides computational efficiency for large network designs.

The Nonlinear_valid_Flag is used to determine which nonlinear validation algorithm is utilized. Initially, this flag is set to initial. After the initial linear equipment placement routines, the launch power computation 500 performs nonlinear validation to ensure that the design passes even when considering nonlinear penalties. If nonlinear validation fails at this point, the launch power computation 500 moves to nonlinear optimization. Therefore, as soon as nonlinear validation fails a single channel of a single lightpath, the launch power computation 500 can exit the validation routine and proceed to nonlinear optimization. To optimize the program for speed of execution, it makes sense to begin the calculation with the lightpath that has the worst Q value (for the worst channel in that lightpath) and work toward the best lightpath. Within each lightpath, computation proceeds from the channel with the worst Q to the best Q. In this case, the Q values used for the sorting function are the estimated (linear) Q values.

During nonlinear optimization, the launch power computation 500 must call the nonlinear validation step in order to determine which channels have passing Q and which channels need regeneration. Here, the flag is set to optimize. In this case the launch power computation 500 wants to at least finish the computation for the lightpath in question, and perhaps finish the computation for all lightpaths before exiting Channels which require a regenerator are marked.

Target fiber input power values are initially set (step 508). First, the target input powers can be set based on a linear or non-linear network basis. For example, this can include a flag set in the initialization step 506. The target fiber input power values are selected based upon predetermined values for different fiber types (e.g., NDSF, LS, TW+, TWC, TWRS, LEAF, eLEAF, DSF, Teralight, and the like). There can also be different values based on the linear or non-linear network basis. In an exemplary embodiment, the target fiber input power values are selected based on a table lookup for each amplifier/node port in the optical network.

A filter placement algorithm is implemented (step 510). Here, DWDM filters (i.e., multiplexers/demultiplexers) are placed at appropriate nodes as required based on wavelength assignments and future projected growth requirements. The launch power computation 500 can also include specifications associated with the various filters to utilize in computing the optimal launch powers for each wavelength.

DCM, amplifier, and pad placement is initialized (step 512). The optical network can include DCM modules at transceiver locations, at intermediate amplifier nodes, and at regenerator nodes. DCMs provide compensation of dispersion and dispersion slope. The DCM can include a tunable and/or low-loss module. The launch power computation 500 is configured to model dispersion versus wavelength for different types of DCM modules. This enables calculation of linear and nonlinear penalties. For example, the DCM can be modeled with either a linear or quadratic fit model for dispersion versus wavelength.

Amplifiers can be included as pre/post amplifiers at transceiver/regenerator locations and at intermediate sites. Optionally, pads can be provided through variable optical attenuators, and are configured to introduce loss to modify an optical signal's power. Pads can be external or internal to various components (e.g., transceivers, amplifiers, filters, etc.). In this step, values are initially set for the various DCMs, amplifiers, and pads in the optical network.

The launch power computation 500 includes a DCM, Amp, and Pad placement algorithm (step 514). The placement algorithm is configured to provide DCM placement, amplifier placement, including Raman and DCM Gain borrowing, pre-emphasis calculations to compensate for amplifier tilt, and linear Q computation. The placement algorithm can include sets of rules operable to perform these functions for the optical network. For example, regional/nonlinear systems can require a tighter dispersion window. Nonlinear systems require a nonlinear minimizing dispersion map. This map may be different whether the optical network needs a "chirped" or "unchirped" dispersion map. For a full-growth computation, the placement algorithm can calculate link-by-link dispersion compensation. If the user choose a "Y1/YN" scenario where Y1/YN denotes year one to year N for a set of predetermined demands, the dispersion compensation can be done on a lightpath basis.

For chirped transmitters (TX), link-by-link dispersion compensation can require an approach where each link is under compensated by a small amount, such that longer paths end up close to the optimum residual dispersion. For unchirped TX, each link can be compensated to near a zero residual dispersion. Ideally DCM and amplifier placement is coupled so that within the confines of the dispersion map the DCM loss is placed most advantageously relative to the amplifiers. This can also help take advantage of DCM Gain Borrowing.

Amplifier Placement can incorporate Raman gain and DCM gain borrowing. In brief, if the DCM loss is less than the maximum allowed interstage loss in an amplifier, the available amplifier gain can be increased by the difference between the two loss values for DCM gain borrowing. The placement algorithm can compute the gain profile for each channel in a Raman amplified span, so that more accurate powers are used in the nonlinear computations. Pre-emphasis allows the optical network to "look back" by one node and adjust the launch power profile in order to achieve a flatter output spectrum. This is more complex in a highly meshed network.

Once the DCMs, amplifiers, and pads are placed, the launch power computation 500 performs post processing (step 516). Here, the launch power computation 500 adjusts input pad values with amplifier gains, and interpolates gain and amplifier noise figures from predetermined figures, such as stored in a table. Next, the launch power computation 500 performs a linear margin analysis (step 518). Here, the OSNR, residual dispersion, and Q for each channel is computed and stored.

The launch power computation 500 performs a Q-based decision function (step 520). Here, appropriate flags can be set based on OSNR, Q, and network types from the placement algorithm. The flags can include minimum launch power, current launch power, and regenerators needed. Additionally, dispersion bounds can be tightened if applicable.

The launch power computation 500 checks to see if Q for all channels is above a passing Q (step 522). If all channels are above the passing Q, then the launch power computation 500 performs post processing equalization (step 524). The launch power computation 500 checks to see if a non-linear analysis is needed for optimization (step 526). Here, nonlinear analysis can be utilized to optimize launch powers to provide improved performance, i.e. better Q. If nonlinear analysis is not needed, then the launch power computation 500 is done (step 528). If nonlinear analysis is needed, then the launch power computation 500 proceeds to step 600 in FIG. 6. Strictly speaking, the launch power computation 500 checks to see if nonlinear analysis is required for "validation." The user can have the option of choosing "linear design with validation" or "nonlinear optimization" which also includes validation. Here (in step 526), it is described as branching into validation. Alternatively, the launch power computation 500 can branch to optimization if validation fails.

First, the launch power computation 500 determines which wavelengths to use in nonlinear computations (step 602). Here, the launch power computation 500 can either analyze the network based on the current demands, i.e. "as-is", or the launch power computation 500 can extrapolate future demands up to full capacity to provide optimized powers for future growth.

Figure 9:
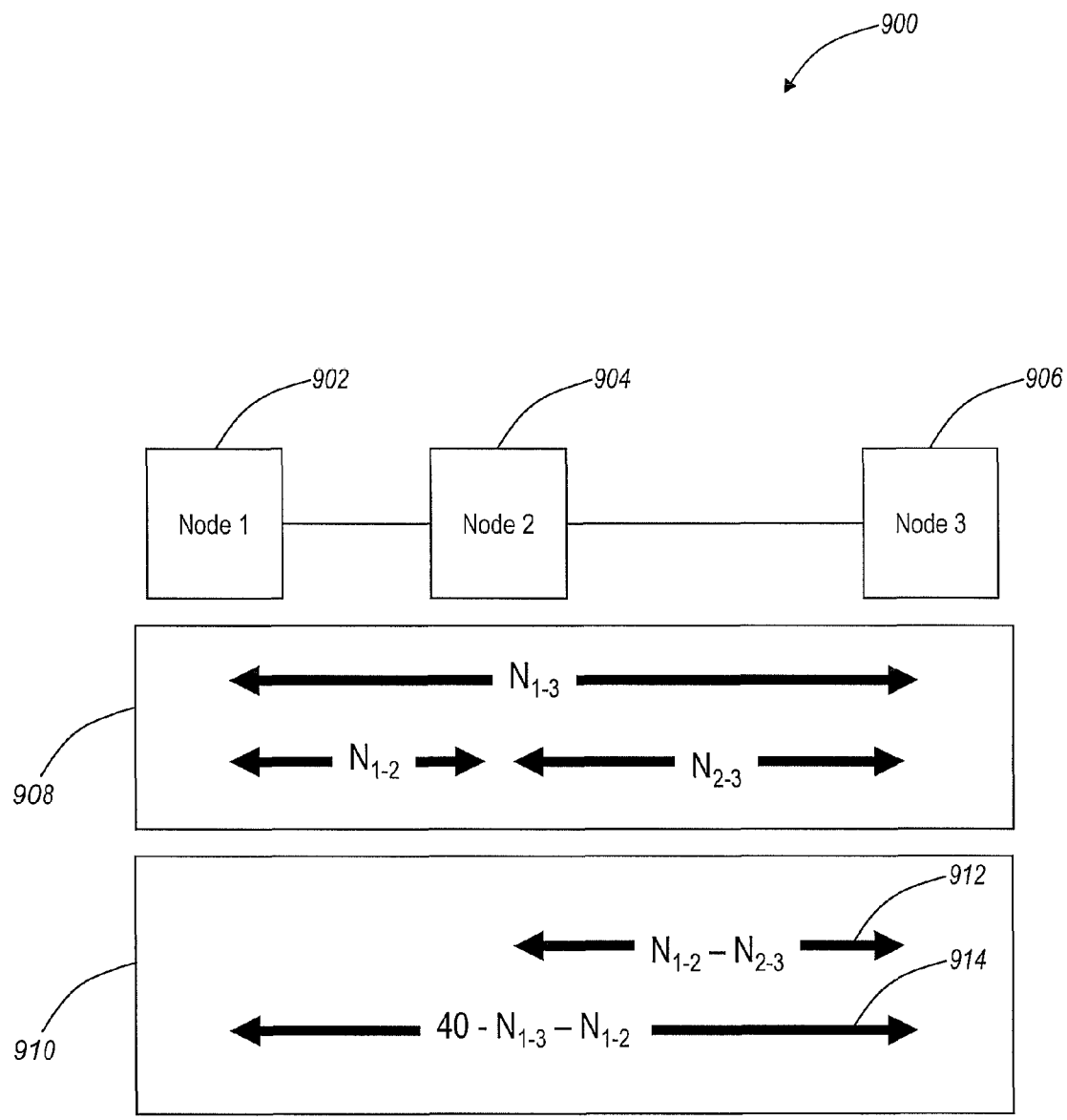
FIG. 9 is a diagram of a three node lightpath with an exemplary set of demands "as-is" and with future demands according to an exemplary embodiment of the present invention.

Referring to FIG. 9, a three node lightpath 900 illustrates an exemplary set of demands "as-is" and with future demands according to an exemplary embodiment of the present invention. The lightpath 900 includes three nodes 902, 904, 906. There are demands from node 1 902 to node 3 906, from node 1 902 to node 2 904, and from node 2 904 to node 3 906. In the "as-is" scenario, the launch power computation 500 only looks at the provisioned demands, e.g. demands 908. In the future growth scenario, the launch power computation 500 adds fill channels for guaranteed growth up to a maximum channel count support by the optical network. If $N_{1-2}$ is not equal to $N_{2-3}$, fill channels are added so that both partial paths have an equal number of channels. In the example of lightpath 900, $N_{1-2}$ has a greater number of channels than $N_{2-3}$, so for the future growth scenario, e.g. demands 910, additional future fill channels are added from node 2 904 to node 3 906, i.e. fill channels 912. If $N_{1-2}$ plus $N_{2-3}$ is less than a maximum fill channel count, such as 40 wavelengths, then fill channels 914 are added to pad the entire lightpath 900 to the maximum channel count. Note, the lightpath 900 illustrates a "simple" three node configuration, and those of ordinary skill in the art will recognize this can be expanded to multi-node in a highly meshed configuration.

After all wavelengths/demands are determined, the signal power for each wavelength is estimated into each DCM throughout the optical network (step 604). This is based on a calculation of known variables, e.g. fiber type, distance, DCM specifications, etc., and the launch power computation 500 uses worst case power by wavelength for this analysis.

With all the data for each wavelength/demand per lightpath, the launch power computation 500 performs nonlinear validation (step 606). During optimization the launch power computation 500 needs to compute nonlinear penalties. If the launch power computation 500 has already gone through nonlinear validation, the penalties are available. These can be stored in a data structure to save computation time. The nonlinear validation is determined based on the Nonlinear_valid_flag, i.e. either initial or optimize.

Figure 10:
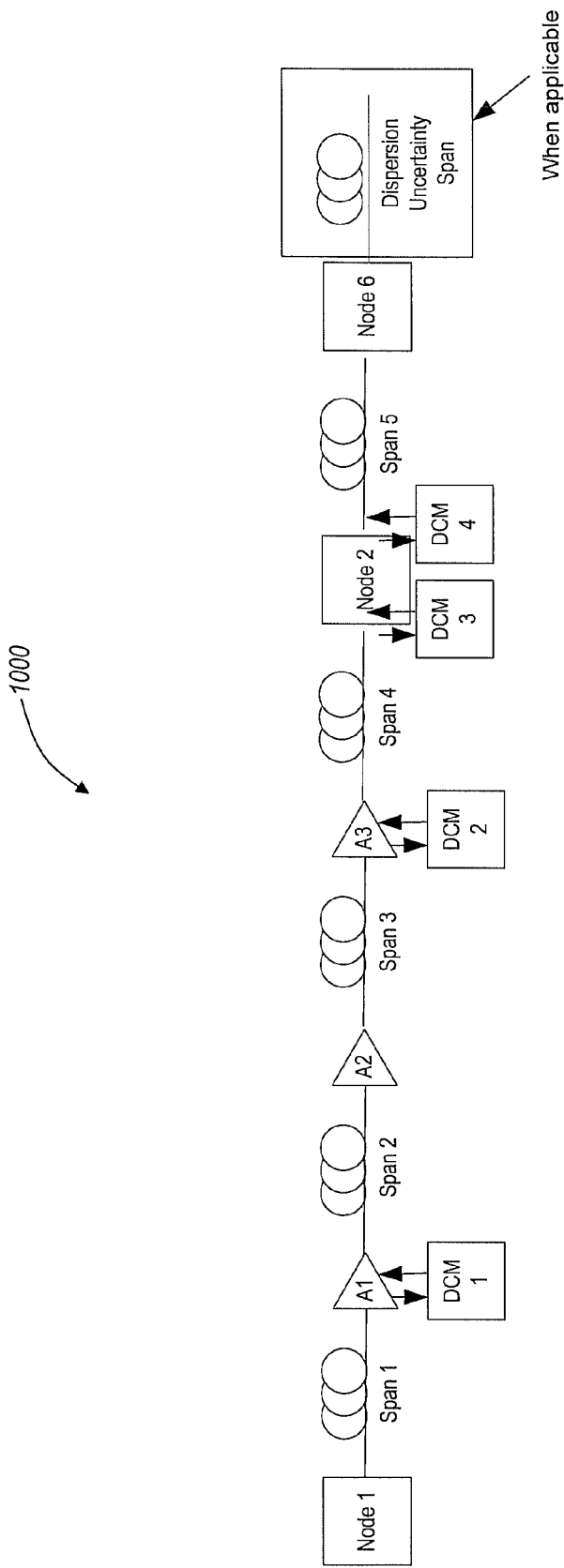
FIG. 10 is a diagram of a five span lightpath for an example of a nonlinear computation carried out in both transmission fiber and DCM fiber according to an exemplary embodiment of the present invention.

Referring to FIG. 10, a five span lightpath 1000 is illustrated for an example of a nonlinear computation carried out in both transmission fiber and DCM fiber according to an exemplary embodiment of the present invention. Typically, any optical system can have a DCM in an amplifier site or at the receiver (RX) node. Additionally, in fixed filter systems, there can also be a DCM in the transmitter (TX) node. This means that an express wave in a fixed filter system can experience DCM on both the RX and TX ports. FIG. 10 shows an example of this: DCM 3 is in the RX port of node 2 and DCM 4 is in the TX port of node 2. The maximum number of DCMs possible in any link is equal to 2*Number_Spans. The maximum number of total fibers, excluding the dispersion uncertainty span, is 3*Number_Spans. For a full nonlinear validation in the launch power computation 500, there can be three levels of dispersion uncertainty (low, high, and mean). The launch power computation 500 treats this as an additional span in the lightpath 1000.

Figure 11:
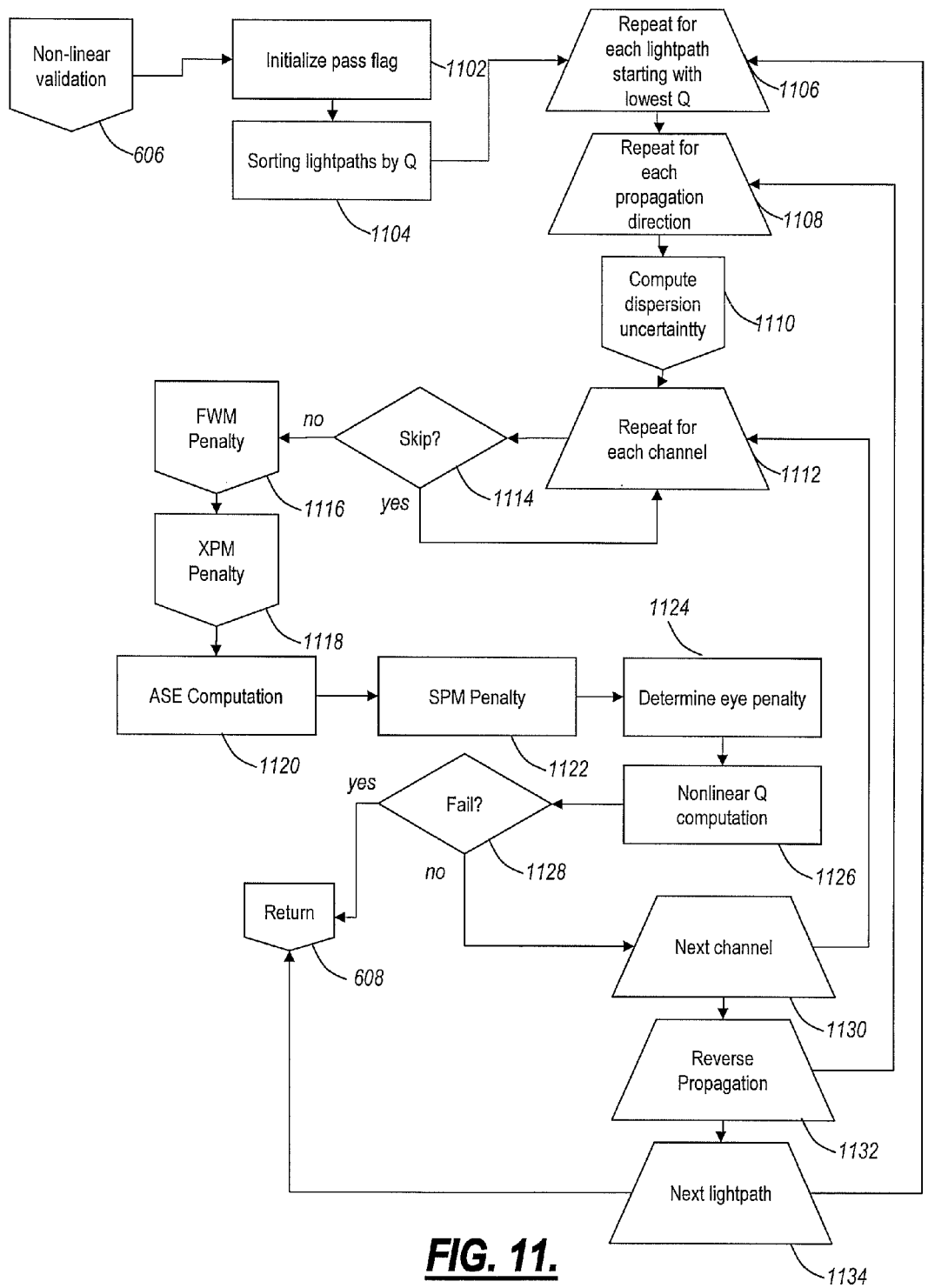
FIG. 11 is a flow chart of a nonlinear validation algorithm according to an exemplary embodiment of the present invention.

Referring to FIG. 11, the initial nonlinear validation algorithm (step 606) starts by setting a pass flag to true (step 1102). To speed up computation, this flag is switched to false on the first failure, i.e. validation can exit. For each lightpath in the optical network, channels are sorted from the lowest Q based on the linear computation (step 1104). Note, for efficiency, only one direction needs to be analyzed on a lightpath assuming they traverse the same fiber, e.g. west to east only. Next, each lightpath is sorted by linear Q. This sorting also increase computational efficiency since likely the worst lightpaths fail first, exiting the validation algorithm.

The initial nonlinear validation algorithm repeats for each lightpath starting with the lightpath with the lowest Q based on the sort (step 1106). Further, the initial nonlinear validation algorithm repeats each propagation direction (i.e., W-E, E-W) (step 1108).

A dispersion uncertainty value is computed (step 1110). This adds another span to the lightpath to account for dispersion uncertainty in the nonlinear penalty calculation. The dispersion uncertainty is calculated on a per wavelength basis for each demand in the lightpath. This calculation utilizes fiber type, fiber dispersion characteristics, dispersion slope, temperature variations, and the like to compute dispersion uncertainty for each demand.

The initial nonlinear validation algorithm repeats for each channel starting with the one with lowest Q (step 1112). If the channel Q is high enough for nonlinear validation, this channel can be skipped (step 1114). Next, the FWM penalty is calculated at mean, low, and high power ripples (step 1116). Since channel power enters into the computation at only one step, it is more efficient to calculate the penalty for all three power levels at once. The FWM computation can be based existing algorithms as are known in the art. Next, the XPM penalty is calculated (step 1118). The XPM computation can be based on existing algorithms as are known in the art.

The nonlinear validation algorithm computes ASE (step 1120) and the SPM penalty (step 1122). Each of these is computed for mean, low, and high ripple powers of each channel. These computations can be done based on existing algorithms as are known in the art. Next, an eye closure penalty is determined (step 1124). Here, the nonlinear validation algorithm can determine there is significant eye closure penalty below a certain threshold, such as 0.6.

Next, the nonlinear validation algorithm utilizes the FWM penalty, XPM penalty, ASE computation, and SPM penalty to compute nonlinear Q (step 1126). This computation can be done for zero, low, and high dispersion uncertainty values. If the nonlinear Q fails, i.e. is below a Q passing threshold (step 1128), then the nonlinear validation algorithm exits to step 608. This reduces computation time in this optimization area by going back to the network design stage once a demand is shown as failing. Note, the present invention could also include other penalties as are known in the art, such as polarization mode dispersion (PMD) and the like.

If the nonlinear Q does not fail, then the nonlinear validation algorithm goes to the next channel (i.e., wavelength) (step 1130). After all channels are complete, the nonlinear validation algorithm reverses the propagation direction (step 1132). After reversing the propagation direction, the nonlinear validation algorithm proceeds to the next lightpath (step 1134). Finally, after completion, the nonlinear validation algorithm returns to step 608.

Referring back to FIG. 6, the launch power computation 500 checks to see if nonlinear optimization is needed based on user input (step 608). The user can specify that they want a linear network design with a nonlinear check or a "full" nonlinear design including optimization. This decision point is independent of Q and is totally driven by the user requirements. If the nonlinear optimization is not needed, then the network design results are reported (step 610), and the launch power computation 500 is complete (step 612).

If nonlinear optimization is requested (step 608), then the launch power computation 500 checks first to see if all demands have passing Q (step 614). If so, then long link connectivity is verified (step 618). The long link connectivity checks each link in the network by looking at one or more of the lowest Q's in terms of demands on the link. A test signal is utilized to simulate performance of these demands to determine if the network needs to be redesigned (step 620). If so, a redesign flag is set which causes a return to step 622. If not, the network design is complete (step 624).

Figure 7:
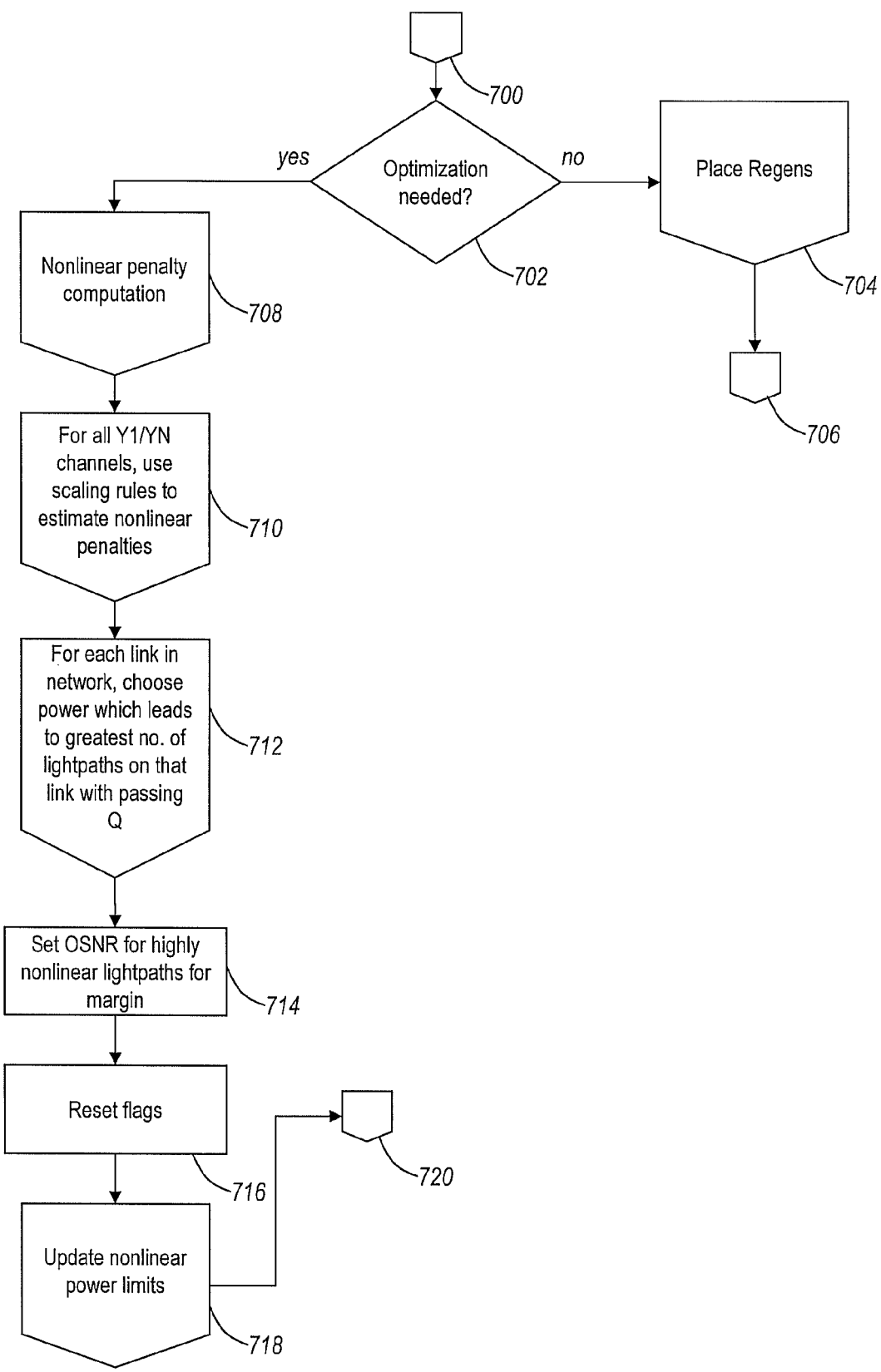
Figure 8:
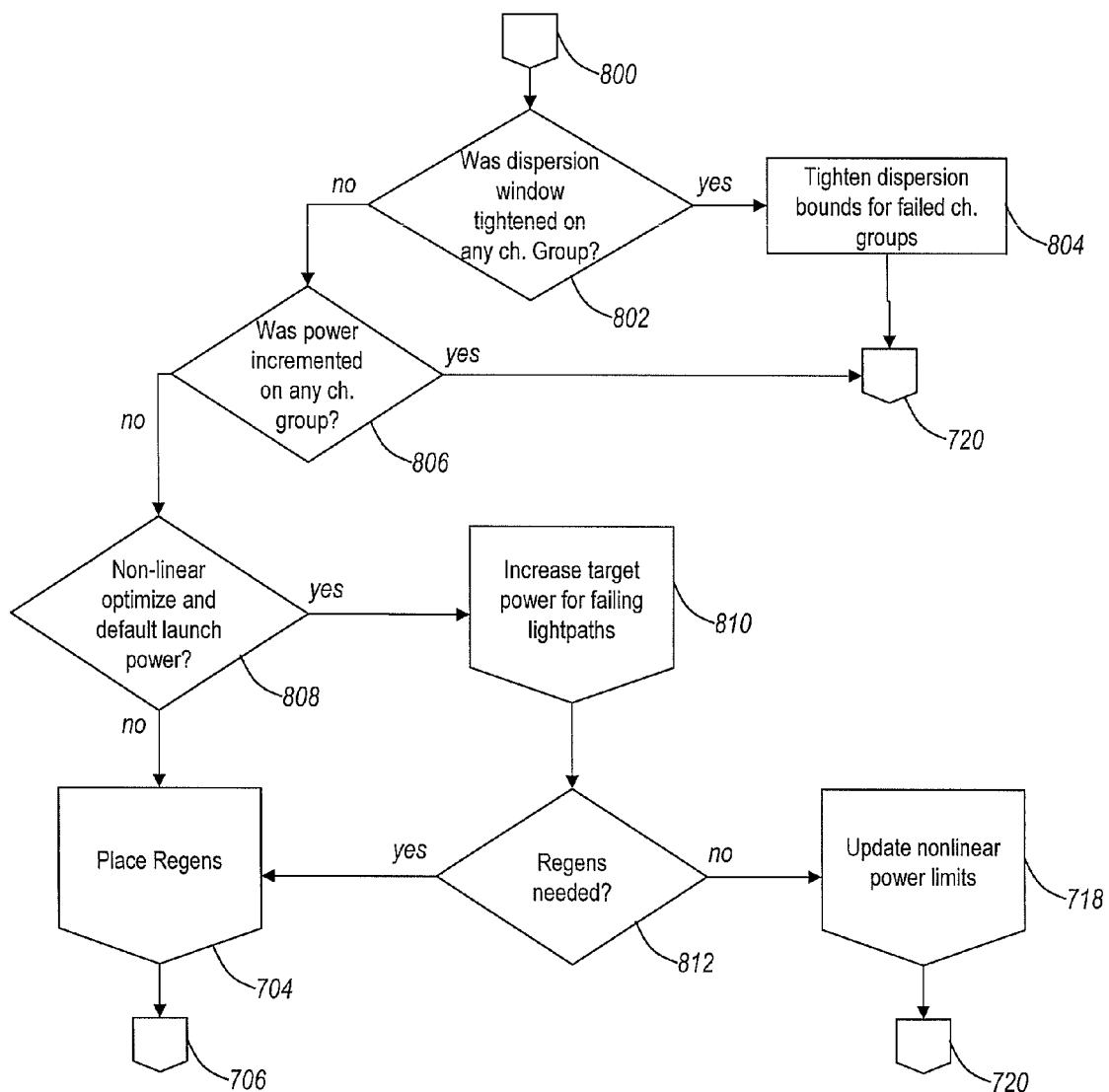

If one or more demands have failing Q (step 614), the launch power computation 500 performs nonlinear optimization (step 700). FIG. 7 illustrates steps associated with nonlinear optimization. The launch power computation 500 checks to see whether optimization has been executed yet (step 702). Note, nonlinear optimization may not be needed since it is not possible to correct failing demands through optimization, and may instead require signal regeneration. If nonlinear optimization is not needed, then the launch power computation 500 moves to place regenerators to correct failing demands (step 704), and moves to step 706.

If optimization is needed (step 702), then a nonlinear penalty is computed (step 708). This nonlinear penalty computation is performed for all provisioned lightpaths using previously selected default power and for potential future filled channels for growth. The nonlinear penalty computation can utilize the previously described FWM, SPM, XPM, and ASE computations. Additionally, the FWM, SPM, XPM, and ASE computations can be based on assumptions, such as through the graphs 200, 300, 400 in FIGS. 2-4. The nonlinear penalty computation can be performed on each demand and in each propagation direction.

For all channels (i.e. Y1/YN channels), the launch power computation 500 utilizes scaling rules for extrapolating to higher or lower powers for all the nonlinear penalties computed (step 710). Here, a maximum channel power value is set based on the number of channels and the amplifier maximum power. A maximum launch power is set based on the fiber types in the lightpath. Then, each demand is viewed at different launch power settings to determine an estimate of nonlinear Q. Scaling rules are used to quickly estimate nonlinear penalties at different launch powers, without doing a full computation.

Next, for each link in the network, the input powers are chosen which lead to the greatest number of lightpaths on that link with a passing Q (step 712). Here, the launch power computation 500 can look at each link in the network (in both propagation directions) and the various different launch power settings to find which settings lead to the greatest number of passing Q values for demands. If there are ties, the launch power computation 500 can choose the median launch power settings. Alternatively, ties could be broken using Q values, using Figure of Merit values, comparing amplifiers costs (i.e., higher launch powers yields more expensive amplifiers), and the like. The chosen launch powers are applied to demands on each link.

An offset OSNR can be added to highly nonlinear lightpaths for margin (step 714). Here, an additional amount of buffer margin may be applicable if the nonlinear computation shows high penalties. Next, nonlinear power limits are updated for each demand in the network (step 718). For each port in the network, the new nonlinear power limit is set to the actual launch power plus the increase/decreased based on the nonlinear optimization mechanisms. The launch power computation 500 returns to step 512 (step 720).

Referring back to FIG. 5, the launch power computation 500 checks to see if Q for all channels is above a passing Q (step 522). If one or more channels have a failing Q based on the linear Q computation, then the launch power computation 500 attempts to correct this problem (step 800). The launch power computation 500 checks to see if any dispersion window was tightened for any channel group (step 800). If so, the launch power computation 500 tightens the dispersion bounds for failed channel groups (step 804) and proceeds to step 512 (step 720).

If the dispersion window was not tightened, then the launch power computation 500 checks to see if power was incremented on any channel groups (step 806). If so, the incremented power is reset, and the launch power computation 500 proceeds to step 512 (step 720). If not, then the launch power computation 500 checks to see if nonlinear optimization is needed based on whether default powers are set (step 808). If not, the launch power computation 500 proceeds to place regenerators (step 704).

If nonlinear optimization is needed in step 808, the launch power computation 500 increases target launch powers for failing lightpaths (step 810). Here, launch power is increased on a lightpath basis, for failing lightpaths only. First, the number of channels is determined ("as-is" versus future growth), and the power is increased based on the fiber types and OSNR values. If it is determined that an increase of launch power does not correct the failing lightpaths, a regenerator flag is set to true indicating this lightpath must be regenerated to correct failing Q.

The launch power computation 500 checks to see if regenerators are needed (step 812). If so, the launch power computation 500 proceeds to place regenerators (step 704). If not, the launch power computation 500 updates nonlinear power limits (step 718). Finally, the launch power computation 500 proceeds to step 512 (step 720).

The mechanisms described herein, i.e. the optical launch power computation 100 and the launch power computation 500, can be operated on a computer including a processor for executing instructions, memory for storing instructions and data, a data store for storing instructions and data, a network interface for receiving data from a network, and input/output interfaces for interacting with the computer. For example, these mechanisms can be integrated into an optical network planning and design tool. Alternatively, these mechanisms can be operated on a network or element management system. Outputs from these mechanisms can be automatically or manually utilized for setting launch powers for each optical node.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optimal launch power computation method, comprising:
providing a data store, a network interface, and input/output interfaces; and
providing a processor coupled to the data store, the network interface, and the input/output interfaces, wherein the processor is configured to:
assign a plurality of demands to a plurality of wavelengths;
determine optical equipment based on a network topology and the plurality of wavelengths;
compute linear Q for each lightpath in the optical network, wherein each lightpath comprises a start and end of one of the plurality of wavelengths;
adjust optical equipment parameters if one or more lightpaths comprise a linear Q below a linear Q threshold and recomputing linear Q for each lightpath in the optical network;
compute nonlinear Q for each lightpath in the optical network; and
perform nonlinear optimization for optical launch powers on each lightpath in the optical network with a nonlinear Q below a nonlinear Q threshold.

2. The optimal launch power computation method of claim 1, further comprising setting launch powers for the plurality of wavelengths to a predetermined default launch power;
wherein the adjusting optical equipment parameters step comprises changing the launch powers.

3. The optimal launch power computation method of claim 1, further comprising computing a nonlinear penalty for each of the plurality of wavelengths;
wherein the nonlinear penalty is utilized by the computing nonlinear Q step and the performing nonlinear optimization step.

4. The optimal launch power computation method of claim 3, wherein the nonlinear penalty is computed for four wave mixing, self phase modulation, and cross phase modulation.

5. The optimal launch power computation method of claim 4, wherein the nonlinear penalty for four wave mixing and cross phase modulation is computed using linear scaling rules to extrapolate to different powers;
wherein the nonlinear penalty for self phase modulation is computed using a quadratic fit.

6. The optimal launch power computation method of claim 1, wherein nonlinear optimization comprises finding launch powers for the plurality of wavelengths that leads to the greatest number of demands on each link with passing Q values.

7. The optimal launch power computation method of claim 1, wherein the assigning step utilizes lengths and fiber types of the optical network to assign the plurality of wavelengths to the plurality of demands.

8. The optimal launch power computation method of claim 1, wherein the nonlinear optimization comprises adding fill channels to the plurality of wavelengths to optimize for future growth of the plurality of demands.

9. The optimal launch power computation method of claim 2, wherein the adjusting optical equipment parameters step comprises adding a regenerator to a demand of the plurality of demands if Q cannot be corrected through nonlinear optimization.

10. A highly meshed optical network launch power computation method, comprising:
providing a data store, a network interface, and input/output interfaces; and
providing a processor coupled to the data store, the network interface, and the input/output interfaces, wherein the processor is configured to:
define network parameters of an optical network, wherein the network parameters comprise node locations, fiber types, A-Z traffic demands;
perform network design comprising assigning equipment to the node locations for the A-Z traffic demands;
assign a default target launch power for each fiber span in the optical network;
compute linear Q performance for each of a plurality of wavelengths in the optical network;
if one or more of the plurality of wavelengths have a linear Q below a linear Q threshold, perform adjustments to the network design;
compute full Q performance comprising linear and nonlinear penalties for the plurality of wavelengths; and
optimize optical launch powers on for each of the plurality of wavelengths.

11. The highly meshed optical network launch power computation method of claim 10, wherein the computing linear Q performance and computing full Q performance steps utilize a representative sample of the plurality of wavelengths to increase computing efficiency.

12. The highly meshed optical network launch power computation method of claim 10, wherein the computing linear Q performance and computing full Q performance steps each further comprise checking computed performance versus a threshold and exiting to the performing network design step to redesign the network if the computed performance is below a threshold.

13. The highly meshed optical network launch power computation method of claim 10, wherein the nonlinear penalties are computed for four wave mixing, self phase modulation, and cross phase modulation.

14. The highly meshed optical network launch power computation method of claim 13, wherein the nonlinear penalties for four wave mixing and cross phase modulation is computed using linear scaling rules to extrapolate to different powers;

wherein the nonlinear penalty for self phase modulation is computed using a quadratic fit.

15. The highly meshed optical network launch power computation method of claim 10, wherein the optimizing step comprises finding launch powers for the plurality of wavelengths that leads to the greatest number with passing Q values versus a Q threshold.

16. The highly meshed optical network launch power computation method of claim 10, wherein the performing network design step utilizes the network parameters to assign the A-Z traffic demands; and
wherein performing adjustments comprises one of increasing the default target launch power for the one or more of the plurality of wavelengths and placing a regenerator along a path of the one or more of the plurality of wavelengths.

17. The highly meshed optical network launch power computation method of claim 10, further comprising adding fill channels to the plurality of wavelengths to optimize for future growth of the A-Z traffic demands.

18. An optimal launch power computation system, comprising:
a data store;
a network interface;
input/output interfaces; and
a processor coupled to each of the data store, the network interface, and the input/output interfaces;
wherein the processor is configured to:
determine optical equipment based on an optical network topology, a plurality of demands between sites on the optical network, and a plurality of wavelengths, wherein launch powers for the plurality of wavelengths are set to predetermined default launch powers;
compute linear Q for each lightpath in the optical network, wherein each lightpath comprises a start and end of one of the plurality of wavelengths;
adjust the optical equipment if one or more lightpaths comprise a linear Q below a linear Q threshold and recomputing linear Q for each lightpath in the optical network;
compute nonlinear Q for each lightpath in the optical network based on computed nonlinear penalties; and
perform nonlinear optimization for optical launch powers on each lightpath in the optical network with a nonlinear Q below a nonlinear Q threshold.

19. The optimal launch power computation system of claim 18, wherein the nonlinear penalties is computed for four wave mixing, self phase modulation, and cross phase modulation;
wherein the nonlinear penalty for four wave mixing and cross phase modulation is computed using linear scaling rules to extrapolate to different powers; and
wherein the nonlinear penalty for self phase modulation is computed using a quadratic fit.

20. The optimal launch power computation system of claim 18, wherein nonlinear optimization comprises finding launch powers for the plurality of wavelengths that leads to the greatest number of demands on each link with passing Q values.

* * * * *